UNITED STATES PATENT OFFICE.

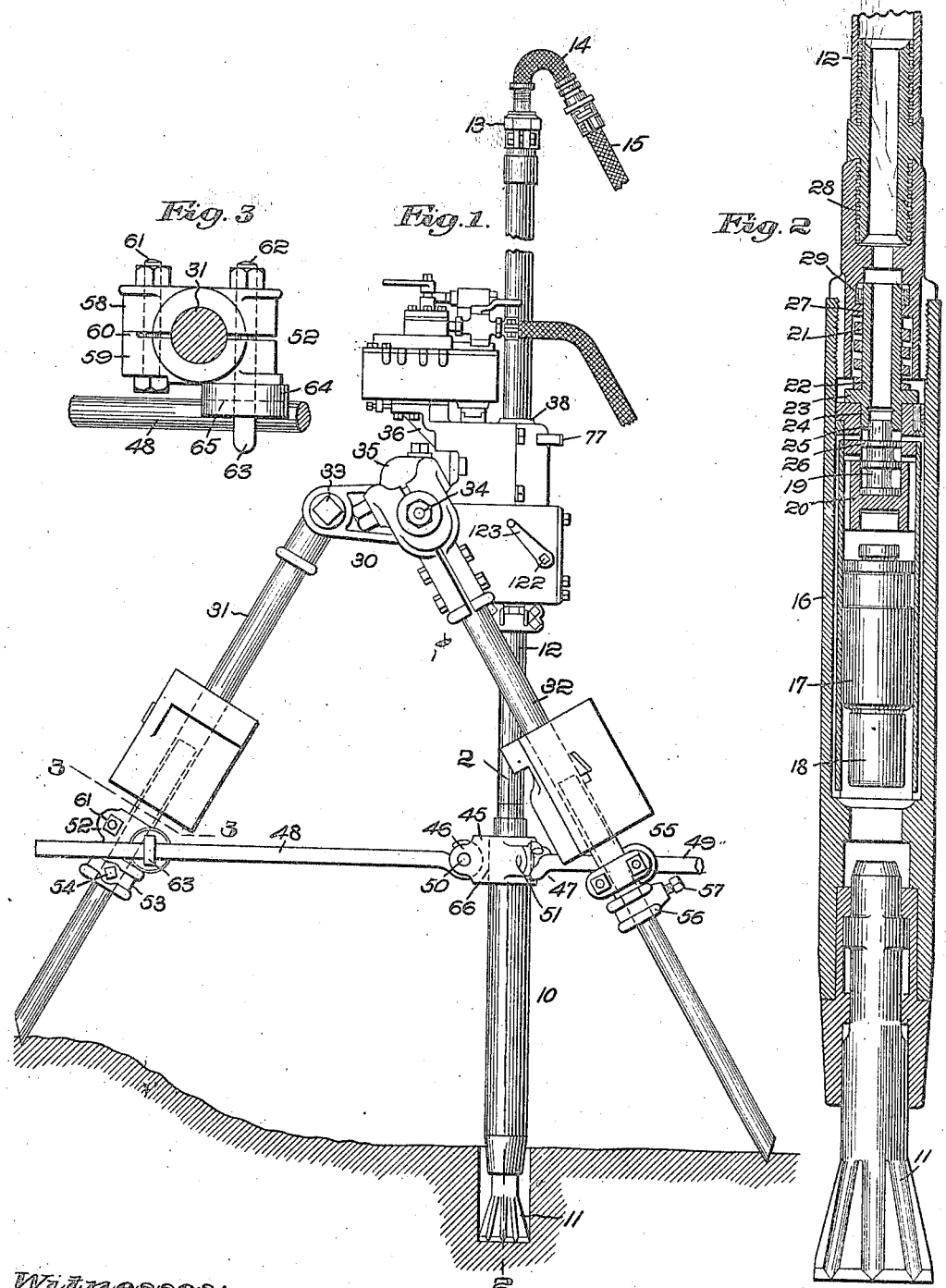

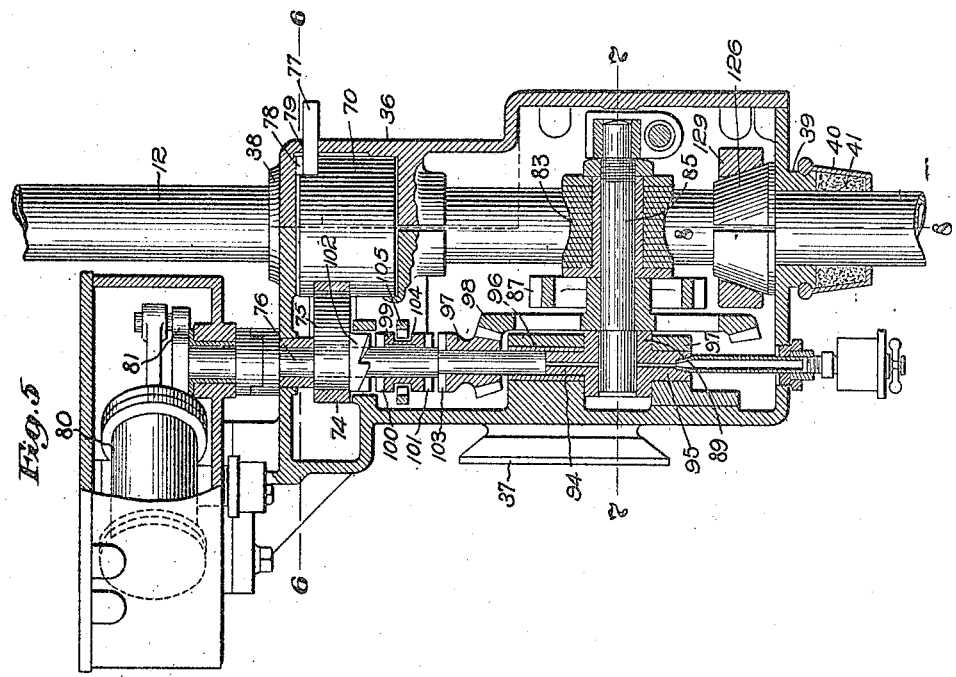

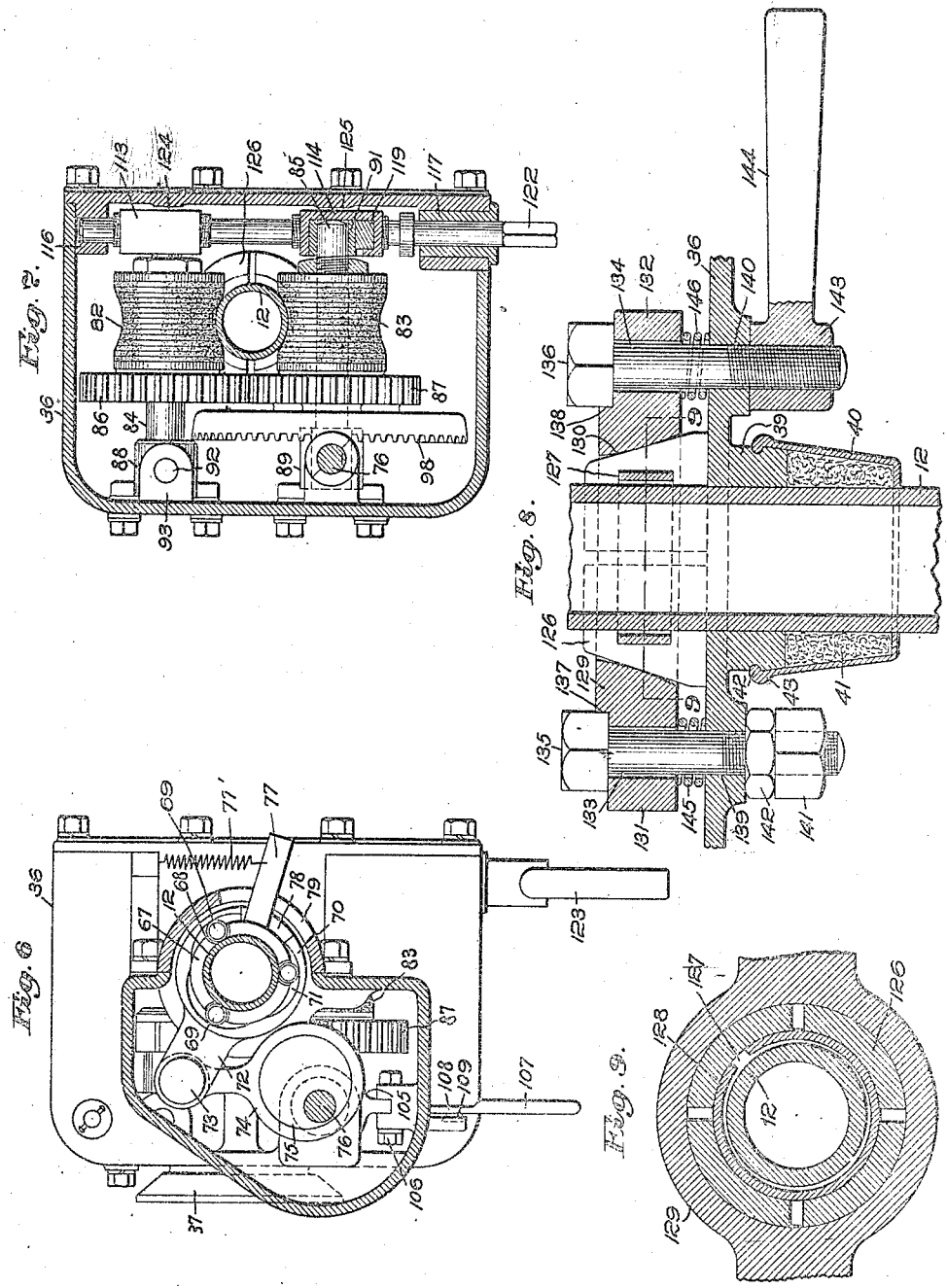

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

DRILLING APPARATUS.

1,236,371.  Specification of Letters Patent.  Patented Aug. 7, 1917.

Application filed June 9, 1913. Serial No. 772,465.

*To all whom it may concern:*

Be it known that I, GEORGE H. GILMAN, a citizen of the United States, and a resident of Claremont, county of Sullivan, and State of New Hampshire, have invented an Improvement in Drilling Apparatus, of which the following description, in connection with the accompanying drawings, is a specification, like characters on the drawings representing like parts.

This invention relates to drilling apparatus, and more especially, though not exclusively, to drills used in deep boring, and employing a percussive drilling engine which is sunk into the drilled hole with the drill-bit.

My invention will be best understood by reference to the following specification, when taken in connection with the accompanying drawings of one specific embodiment thereof, while its scope will be more particularly pointed out in the appended claims.

In the drawings:

Figure 1 is an elevation of a drilling apparatus embodying my invention;

Fig. 2 is a sectional view on an enlarged scale on line 2—2 of Fig. 1;

Fig. 3 is a detail plan section on an enlarged scale on line 3—3 of Fig. 1;

Fig. 4 is an enlarged detail elevation, partly in section, showing on an enlarged scale the tool-rotating, hoisting and holding mechanisms, as viewed from the right hand side of Fig. 1, with the cover of the inclosing casing removed;

Fig. 5 is a sectional view, partly in elevation, on line 5—5 of Fig. 4;

Fig. 6 is a plan section on line 6—6 of Fig. 5, illustrating the tool-rotating mechanism;

Fig. 7 is a plan section on line 7—7 of Fig. 5, illustrating the hoisting mechanism;

Fig. 8 is a detail sectional view, partly in elevation on an enlarged scale on line 8—8 of Fig. 5; and Fig. 9 is a detail plan section on line 9—9 of Fig. 8.

Referring to the drawings, and to the embodiment of my invention which I have selected for illustrative purposes, I have there shown a drilling apparatus comprising a percussive drilling engine, designated generally by the numeral 10, the latter being provided with a suitable drill-bit 11, whose diameter of cut as herein shown is wider than the largest diameter of the remainder of the drilling engine. The drilling engine is herein provided with a shank 12, which may be, and preferably is, coaxially arranged with respect to the drilling engine, and is preferably in the form of a conduit for the supply of pressure fluid to actuate the drilling engine. This tubular shank, which in practice extends upwardly to a considerable height above the drilling engine, is provided at its upper end with a swivel joint 13, and a goose neck 14, by means of which it is connected to a flexible supply hose 15. By this means, actuating pressure fluid may be supplied to the drilling engine, while allowing the latter to be rotated, and at the same time move axially with respect to the work.

While the drilling engine may be of any other suitable construction, the same herein is of the hammer type, and comprises a cylinder 16, in which a piston hammer 17 reciprocates, the latter having a reduced hammer portion 18 which strikes the upper end of the drill-bit 11, or a suitable striking pin acting thereon. Herein the piston is controlled in its movements by a controlling valve 19, which may operate in any practicable manner, to control the admission of actuating fluid to, and exhaust from, opposite ends of the cylinder. Herein, the controlling valve is mounted in a valve block 20, and the latter is slidably mounted in the engine casing, so as to be capable of yielding rearwardly should it be struck by the piston in the upward movement of the latter, caused by a severe rebound when the tool is operating on very hard rock. I may employ any suitable yielding means, tending to resist the rearward or upward movement of the valve block, but herein I provide a helically coiled spring 21, encircling a tubular member 22, constituting a supply connection between the valve block and the tubular shank 12. This supply connection is provided with a laterally projecting circumferential flange 23, seated upon the upper or rear end of the valve block, and is provided with a nipple, or reduced portion 24, entering the valve block. This reduced portion is herein constructed to receive a rear or upper reduced end 25 of the controlling valve, which latter is provided with an annular flange 26 that strikes against the forward or lower end of the reduced portion 24, and limits the rearward, or upward, motion of the valve. By this means, the valve block and valve are cushioned in such a manner as to absorb the shock caused by the impact of the hammer piston, when it rebounds. The tubular member 22 is arranged in telescopic relation with the supply conduit 12, and may be mounted to slide in an aperture 27 formed in a connecting member 28, constituting the head, or upper end, of the engine's cylinder. Preferably, the upper end of the tubular member 23 where it passes through the aperture 27 is encircled by a suitable packing ring 29, serving to prevent leakage of the pressure fluid at that point. The particular construction and mode of operation of the controlling valve is not essential to my present invention, and I therefore deem it unnecessary to enter into a detailed description or showing of its construction.

The drilling engine may be mounted and guided in any other appropriate manner, but herein is provided with a tripod 30, which may have, as usual, a leg 31 and a pair of legs 32, only one of the latter being shown, since one is disposed directly behind the other. The leg 31 is mounted on a pivot 33, and the legs 32 on a pivot 34 on a saddle 35, on which latter a casing 36 is swiveled in a familiar manner, the latter for this purpose being provided with a hub portion 37. (See Figs. 5 and 6). The casing 36 may constitute a guide for the tubular shank 12, and for that purpose is herein provided with upper and lower guides 38 and 39, respectively. In order to exclude dirt and accumulations of other foreign matter on the shank 12 from the casing, the latter may be provided with a hollow collar 40, containing a body of suitable packing material 41, such for example as waste, which will serve to wipe the shank as it ascends. Herein, the collar 40 is split (see Fig. 4), and is provided with a lip in the form of an inwardly projecting annular flange 42, engaging a groove 43 formed in the depending guide 39 above referred to. The split collar may be caused to grip the depending guide 39 by one or more clamping bolts 44. (See Fig. 4).

As a means for guiding the drilling engine to facilitate an accurate starting of the hole, I may provide a lower guide 45, in which the engine casing is mounted to slide. While this guide may be mounted in any other appropriate manner, it is herein supported by the legs on the tripod in such a manner that the latter may be adjusted. In the present instance, I have provided a guide with a pair of ears 46, and two pairs of ears 47, only one pair of the latter being shown, it being understood, however, that the guide is provided with one pair of ears corresponding to each of the three legs of the tripod. Each pair of ears is connected in any appropriate manner to the corresponding leg of the tripod, as for example by braces 48 and 49, pivoted at 50 and 51 to their respective ears. The braces may be secured to their corresponding legs by any suitable means permitting angular and longitudinal adjustment of the braces with respect to the legs. Herein the leg 31 is provided with a longitudinally adjustable clamp 52, above a clamping collar 53 provided with a set screw 54, and each of the legs 32 is provided with a similar clamp 55, below which is placed a clamping collar 56 provided with a set screw 57. The collars 53 and 56 permit lengthwise adjustment of their respective legs of the tripod, by telescoping the latter in the usual and wellknown manner. All of the clamps just referred to are exactly similar to each other in construction, and therefore a detailed description of the clamp 52 will suffice for all.

Referring to Fig. 3, the clamp 52 comprises two clamping blocks 58 and 59, which embrace the leg 31 of the tripod. The clamping block 59 is provided with a shoulder 60, bearing against the adjacent face of the clamping block 58, while the clamping blocks throughout the remainder of their extent are separated by a space permitting them to be drawn firmly into engagement with the leg 31, by means of two clamping bolts 61 and 62. The latter is herein provided with an eye 63, through which the brace 48 extends. Interposed between the latter and the adjacent face of the clamping block 59 is a washer 64, provided with a groove 65 which receives the brace rod, and the washer is suitably recessed and perforated to receive loosely the eye of the bolt 62. It will now be evident that by loosening the nut of the bolt 61 and 62, the clamp may be shifted longitudinally of the leg 31, and the brace rod 48 may be adjusted both longitudinally and angularly with respect to the clamp, this being accomplished by sliding the brace rod through the eye 63, or by swinging the brace rod, the washer 64 and the clamping bolt 62 about the axis of the latter to whatever extent may be necessary to permit the desired positioning of the tripod leg. It will be understood that each of the other two clamps is constructed in an exactly similar manner.

It will be readily understood that by properly adjusting the guide 45 with relation to the legs of the tripod, the guide will serve accurately to position the drilling engine and facilitate the starting of the hole. After the latter has been started, and the drilling engine has sunk some distance thereinto, the casing of the drilling engine will pass downwardly through and beyond the guide 45, which will then loosely surround the shank 12. After the drilling of the hole has been completed, and the drilling tool is drawn upwardly to its initial position, the engine casing will again pass into and be guided by the guide 45. The latter may be, and preferably is, provided with a flaring mouth, or aperture 66, to facilitate the entrance of the engine casing thereinto.

As a means for rotating the drilling engine and its drill-bit step by step as it is fed into the rock, I may provide any suitable rotating mechanism engaging the shank 12. Herein I have provided a familiar form of roller clutch comprising a roller cage 67 encircling the shank 12, and provided with a plurality of recesses 68 to receive rollers 69 adapted to engage the periphery of the shank. A collar 70, encircling the roller cage 67 is provided with a plurality of pockets, or recesses, 71 to receive the rollers respectively, and these pockets are so shaped as to cause the rollers to grip the shank when the collar is rotated in one direction, and release the shank when rotated in the opposite direction. The collar 70 is herein provided with an arm 72, pivoted at 73 to an eccentric strap 74 encircling an eccentric 75. The latter may be suitably turned on a power shaft 76, which when rotated will serve to impart an oscillatory motion to the collar 70, thereby causing the latter to rotate the shank step by step. As a means for manually releasing the clutch rollers from their driving engagement with the shank 12 when it is desired to move the latter axially, the roller cage 67 may be provided with an arm 77 projecting through a slot 78 in the collar 70, and a slot 79 in the casing 36. By simply grasping the arm 77, the operator may swing the roller cage 67 until the rollers are positioned at the deepest portions of their recesses 71. When this has taken place, the shank may be moved freely axially toward or from the work. A suitable spring 77' attached to the arm 77 normally maintains the roller 67 in its effective, or normal, working position, as shown.

The power shaft 76 may be rotated by hand, or any other appropriate power means, but herein is driven by an engine, or motor, as for example, a pressure fluid engine 80 having a crank shaft 81, suitably coupled to the shaft 76.

Preferably, though not necessarily, the drilling engine is raised by suitable lifting mechanism, which engages the shank 12 and imparts an axial movement thereto in an upward direction. The mechanism as herein shown comprises a pair of friction rollers 82 and 83, adapted to engage opposite sides, respectively, of the shank. These rollers may be of any other appropriate form, but herein are grooved to receive the shank, and each is composed of a plurality of thicknesses or layers of fiber, raw-hide, leather, or other suitable material. The rollers 82 and 83 are secured, respectively, to shafts 84 and 85, preferably geared together to rotate in unison by means of spur gears 86 and 87, respectively, secured to said shafts. The shafts 84 and 85 are journaled at one pair of ends in bearings 88 and 89, respectively, and at their other ends in bearing blocks 90 and 91. The bearing 88 is pivoted at 92 in a yoke 93, embracing said bearing, while the bearing 89 is provided with trunnions 94 and 95, mounted in suitable bearings 96 and 97 coaxially with the shaft 76 already referred to. The latter may be journaled at its lower end in the bearing 96 just referred to, and may transmit power from the engine or motor 80 to the friction rollers through suitable gearing, such for example as a beveled pinion 97 secured to the shaft 76 meshing with a beveled gear 98 secured to the shaft 85. Any suitable means may be provided at will to render the motor effective to impart a rotative or axial movement to the drilling engine through its shank, and any suitable means may be provided to couple either the rotating mechanism or the hoisting mechanism to the power shaft at will. In the present instance, the eccentric 75 and beveled pinion 97 are both normally loose upon the power shaft 76, but either may be coupled thereto at will by a sliding clutch member 99, splined on the shaft and having clutch jaws 100 and 101 adapted to engage similar clutch jaws 102 and 103, respectively, on the eccentric and beveled pinion. When the sliding clutch member is in its central, or neutral position, as shown in Fig. 5, the eccentric and beveled pinions are both loose upon the driving shaft; but either may be coupled to, and driven by, the shaft by shifting the clutch member in the proper direction. For this purpose, the clutch member may be provided with an annular groove 104, to receive a clutch shifting member 105 pivoted at 106 and provided with an operating handle 107 located externally of the casing 36. The clutch may be held in either of its three positions by any other suitable means, but herein the clutch shifting handle 107 is provided with a flexible yielding portion 108, having a tooth 109 adapted to enter any one of three notches 110, 111 and 112. (See Fig. 4).

Since the shafts 84 and 85 of the rollers 82 and 83 are mounted on the pivots already described, they will swing toward and away from each other in a plane containing their axes. By reference to Fig. 7, it will be observed that this may take place without interfering with the driving connection between the beveled pinion 97 and the beveled gear 98, since the latter swings about the axis of the former. It will also be apparent that the rollers may be moved toward and away from each other without interrupting their driving connection with each other, since the spur gears 86 and 87 will permit considerable relative movement without unmeshing.

As a means for moving the rollers toward and away from each other at will, to carry them into and out of engagement with the shank of the drilling engine, the bearing blocks 90 and 91 already referred to are carried by nuts 113 and 114 threaded onto a right and left screw-threaded shaft 115, journaled in bearings 116 and 117, the shaft, however, having a slight free play lengthwise, thereby to permit the pressure of the rollers upon the shank to be equalized. The rollers may be caused to engage the shank with yielding pressure by any suitable means, as for example yielding means herein in the form of rubber blocks 118 and 119 interposed between the bearing blocks 90 and 91, respectively, and the adjacent ends of recesses 120 and 121 in the nuts 113 and 114 respectively, said recesses forming guides in which the bearing blocks are mounted to slide. It will be readily understood that when the right and left screw-threaded shaft 115 is rotated in the proper direction, the nuts 113 and 114 will be caused to act through the yielding members 118 and 119 to move the shafts 84 and 85 toward each other, thereby to cause the rollers 82 and 83 to bear with yielding pressure against the shank 12. When, however, the shaft 115 is rotated in the opposite direction, the rollers will be carried positively out of engagement with the shank.

The shaft 115 may be rotated by any other suitable means, but herein is provided with a squared shank 122, to receive a manually operable crank 123. When the shaft is rotated, the nuts 113 and 114 may be guided and held against rotation by guides, herein consisting of finished flat faces 124 and 125, formed within the casing or housing 36. (See Fig. 7). By the mechanism just described, after the drilling operation has been completed, the drilling engine may be lifted out of the drilled hole by simply forcing the rollers 82 and 83 into engagement with the shank 12, after which the clutch shifting lever 107 is utilized to shift the clutch member 99 into engagement with the beveled pinion 97, thus causing the power of the motor 80 to be transmitted through the described driving connections to the friction rollers. When the drilling engine has been lifted to the desired extent, it may be held in such position by any other appropriate means, but I prefer to employ for this purpose some suitable means for frictionally gripping the shank and preventing its axial movement. Herein I provide an expansible and contractible collar 126, which may be composed of a plurality of segments, having an internal groove 127 to receive a spring 128 tending to move the segments out of engagement with the shank. (See Figs. 8 and 9). The collar 126 may be, and preferably is, tapered, and is encircled by an outer collar 129 having an aperture 130 similarly tapered, but preferably somewhat rounded, as shown in Fig. 8, for a purpose which will presently appear.

By moving one of the described collars in the proper direction axially with respect to the other, their coöperating tapered surfaces will serve to cause the single contractible collar forcibly to engage and grip the shank 12, thereby to secure the latter in fixed position. For this purpose, either of the collars may be moved, but herein I prefer to mount the collar 129 for axial movement. To this end, the outer collar is herein provided with ears 131 and 132, provided respectively with perforations 133 and 134, through which bolts 135 and 136 pass loosely. These bolts may be held against rotation by providing the collar with shoulders 137 and 138, engaging the heads of the bolts 135 and 136, respectively. (See Fig. 8). The bolts pass through perforations 139 and 140 in the casing, or housing, 36, and the bolt 135 is provided with a nut 141 and lock nut 142, while the bolt 136 is provided with a nut 143 having a grasping portion 144 serving as a handle, by means of which it may be rotated. Preferably, the bolt 135 is provided with a fine thread by means of which it may be utilized to adjust the collar 129 axially, while the bolt 136 is preferably provided with a coarse pitch screw, whereby it may be caused to impart a comparatively rapid axial motion to the outer collar to cause the latter to grip the shank. Preferably, the collar 129 rests upon a suitable spring or springs tending to move the same out of engagement with the inner and contractible collar 126. In the present instance, I employ a helically coiled spring 145, encircling the bolt 135, and a spring 146, encircling the bolt 136, and serving to press the collar 129 upwardly against the bolt heads. (See Fig. 8). It will now be evident that by swinging the handle 144 in the proper direction, the bolt 136 and nut 143 are caused to coöperate to move the collar 129 axially, and since the latter is normally held immovable at one end by the bolt 135, the collar will have a swinging movement. Since, however, the aperture 130 of the collar 129 has a rounded taper, such swinging movement of the collar will have no disturbing effect upon its operation with respect to the inner contractible collar 126.

The general operation of the drilling apparatus hereinbefore specifically described is as follows: The tripod is first placed over the spot where the hole is to be drilled, and its legs are adjusted to suit the irregularities of the surface of the rock, it being understood that during the preliminary setting up of the apparatus, the drilling engine will be held raised above the surface of the rock by the described gripping device. The drilling engine is adjusted to the desired point where the hole is to be drilled in the rock, and the lower guide is adjusted and then rigidly secured to the legs of the tripod, thereby to guide the drilling engine, and insure an accurate starting of the hole. Having done this, the gripping device is manipulated to allow the shank and drilling engine to descend gently until the drill-bit rests upon the surface of the rock. The gripping device is then caused to release the shank and allow the latter to move freely axially under the influence of gravity. The drilling tool is now ready for operation. The operator then turns on the supply of pressure fluid to the drilling engine, and to the rotating motor, and throws the clutch into position to cause the rotating mechanism to impart a step by step rotative movement to the tool shank. This having been done, the apparatus is in full operation, and the drilling engine will operate its drill-bit in a familiar manner to percussively cut the rock while being rotated therein, and as the cutting proceeds, the drilling engine will sink into the drilled hole with the drill-bit.

It will be evident that, by extending the shank 12, the drilling engine may be caused to drill holes to a considerable depth in the rock, while still securing the wellknown advantages of the use of a tool of the hammer type, since the drill-bit is short and always of the same length. When the hole has been drilled to the desired depth in the rock, the clutch is then shifted and the operator causes the friction rollers to grip the shank, thereby to impart an axial movement to the latter in an upward direction, until the drilling engine has been entirely lifted from the drill hole, whereupon the gripping device is brought into play to hold the drilling engine in its raised position.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made without departing from the principles thereof.

Having thus described my invention, what I claim and desire by Letters Patent to secure is:

1. A drilling apparatus comprising, in combination, a percussive drilling engine, a motor, and means at will to render said motor effective to impart a rotative or axial movement to said drilling engine.

2. A drilling apparatus comprising, in combination, a percussive drilling engine, rotating means for imparting a rotative movement to said engine, lifting means for imparting an axial movement to said engine, a power shaft, and means at will to connect said rotating means or said lifting means to said engine.

3. A drilling apparatus comprising, in combination, a percussive drilling engine, rotating means for imparting a rotative movement to said engine, lifting means for imparting an axial movement to said engine, a power shaft, a clutch and means to operate said clutch to connect said rotating means or said lifting means to said engine.

4. A drilling apparatus comprising, in combination, a percussive drilling engine, a shank secured axially to said engine, means engaging said shank for imparting an axial movement thereto, means engaging said shank for imparting a rotative movement thereto, a motor, and means to render said motor effective to operate said means to rotate said engine or said means to impart an axial movement thereto.

5. A drilling apparatus comprising, in combination, a percussive drilling engine, a shank secured axially to said engine, means to guide said shank and permit said engine to be fed by gravity into the work, a motor, and means to render said motor effective at will to rotate said shank or impart an axial movement thereto.

6. A drilling apparatus comprising, in combination, a drilling tool having a shank, means to guide said shank and permit the tool to be fed into the work, frictional means to grip said shank and hold said tool against axial movement, and yielding means tending to release said frictional grip means.

7. A drilling apparatus comprising, in combination, a drilling tool having a shank, means to guide said shank and permit the tool to be fed into the work, frictional means to grip said shank and tool against axial movement, yielding means tending to release said frictional grip means, and positive actuating means acting in opposition to said yielding means.

8. A drilling apparatus comprising, in combination, a drilling tool having a shank, means to guide said shank and permit the tool to be fed into the work, a split collar encircling said shank, and means to contract said collar thereby to grip said shank.

9. A drilling apparatus comprising, in combination, a drilling tool having a shank, means to guide said shank and permit the tool to be fed into the work, a contractible collar encircling said shank, and means to contract said collar thereby to cause the same to grip said shank.

10. A drilling apparatus comprising, in combination, a drilling tool having a shank, means to guide said shank and permit the tool to be fed into the work, a tapered contractible collar encircling said shank, and means to contract said collar including an outer collar encircling said tapered contractible collar.

11. A drilling apparatus comprising, in combination, a drilling tool having a shank, means to guide said shank and permit the tool to be fed into the work, a tapered contractible collar encircling said shank, and means to contract said collar including an outer collar encircling said tapered contractible collar, and means to move one of said collars axially relatively to the other.

12. A drilling apparatus comprising, in combination, a drilling tool having a shank, means to guide said shank and permit the tool to be fed into the work, a tapered contractible collar encircling said shank, and means to operate said collar including an outer collar encircling said contractible collar, yielding means tending to expand said contractible collar, yielding means tending to move one of said collars in one direction axially out of engagement with the other, and means to move one of said collars axially in the opposite direction relatively to the other.

13. A drilling apparatus comprising, in combination, a drilling tool having a shank, means to guide said shank and permit the tool to be fed into the work, a tapered contractible collar encircling said shank, and means to operate said collar including an outer collar encircling said contractible collar, and a screw to move said outer collar axially.

14. A drilling apparatus comprising, in combination, a drilling tool having a shank, means to guide said shank and permit the tool to be fed into the work, a tapered contractible collar encircling said shank, and means to operate said collar including an outer collar encircling said contractible collar, a screw arranged to move said outer collar axially in one direction, and a spring arranged to move said outer collar axially in the opposite direction.

15. A drilling apparatus comprising, in combination, a drilling tool having a shank, means to guide said shank and permit the tool to be fed into the work, a tapered contractible collar encircling said shank, an outer collar encircling said contractible collar, means for adjusting said outer collar axially, and means for moving said outer collar axially to operate said contractible collar.

16. Drilling apparatus comprising, in combination, a drilling tool, a shank secured to said tool, a pair of lifting rollers engaging said shank, and pressure means to cause said rollers to bear with equal lifting pressure against said shank.

17. Drilling apparatus comprising, in combination, a drilling tool, a shank secured to said tool, a pair of lifting rollers engaging said shank, and pressure means including yielding members and a right and left threaded screw for carrying said rollers with yielding pressure into engagement with said shank.

18. Drilling apparatus comprising, in combination, a drilling tool having a shank, means for imparting axial movement thereto including a pair of rollers engaging said shank, a pair of shafts on which said rollers are respectively mounted, said shafts being pivoted to swing in a plane containing their axes, and means to swing said shafts toward each other thereby to carry said rollers into engagement with said shank.

19. Drilling apparatus comprising, in combination, a percussive drilling tool, a shank secured axially thereto, roller means of yielding material, means for forcing said roller means into yielding engagement with said shank, and driving means for imparting rotary movement to said roller means to lift said shank and said drilling engine.

20. Drilling apparatus comprising, in combination, a percussive drilling tool, a shank secured axially thereto, a plurality of rollers of yielding material, means for forcing said plurality of rollers into yielding engagement with said shank, and driving means for imparting rotary movement to said plurality of rollers to lift said shank and said drilling engine.

21. Drilling apparatus comprising, in combination, a percussive drilling tool, a shank secured axially thereto, rollers, means for causing said rollers to grip said shank or release said shank as desired, and an actuator for imparting rotary movement to a plurality of said rollers whereby axial movement may be imparted to said shank when said rollers are in gripping relation to said shank.

22. Drilling apparatus comprising, in combination, a drilling tool, means for imparting axial movement thereto including a pair of rollers, gearing connecting said rollers, a member interposed between said rollers and connected to said tool, and means for moving said rollers into and out of gripping relation to said member.

In testimony whereof, I have signed my name to this specification, in the presence of two subscribing witnesses,

GEORGE H. GILMAN.

Witnesses:
W. A. RICE,
SARAH B. FITCH.